United States Patent
Bergman et al.

(10) Patent No.: US 11,063,951 B1
(45) Date of Patent: Jul. 13, 2021

(54) SYSTEMS AND METHODS FOR CORRECTING FILE SYSTEM PERMISSIONS

(71) Applicant: Stealthbits Technologies LLC, Hawthorne, NJ (US)

(72) Inventors: Sean Bergman, Jersey City, NJ (US); Kyle Michael Enman, Hoboken, NJ (US); Jeffrey Adam Warren, Ridgewood, NJ (US)

(73) Assignee: Stealthbits Technologies LLC, Hawthorne, NJ (US)

( * ) Notice: Subject to any disclaimer, the term of this patent is extended or adjusted under 35 U.S.C. 154(b) by 570 days.

(21) Appl. No.: 15/787,246

(22) Filed: Oct. 18, 2017

(51) Int. Cl.
*G06F 16/182* (2019.01)
*H04L 29/06* (2006.01)
*G06F 16/11* (2019.01)

(52) U.S. Cl.
CPC .......... *H04L 63/101* (2013.01); *G06F 16/122* (2019.01); *G06F 16/182* (2019.01)

(58) Field of Classification Search
CPC ........................... G06F 16/122; G06F 16/182
See application file for complete search history.

(56) References Cited

U.S. PATENT DOCUMENTS

| 10,567,388 | B1* | 2/2020 | Kruse | H04L 63/20 |
| 2004/0019807 | A1* | 1/2004 | Freund | H04L 63/145 726/1 |
| 2013/0246470 | A1* | 9/2013 | Price | G06F 21/6218 707/783 |
| 2015/0296012 | A1* | 10/2015 | Piyush | H04L 67/1095 726/1 |
| 2016/0292443 | A1* | 10/2016 | von Muhlen | G06F 16/16 |
| 2017/0149885 | A1* | 5/2017 | Kaplan | H04L 67/303 |
| 2018/0102952 | A1* | 4/2018 | Gopalakrishnan | H04L 43/04 |
| 2018/0124129 | A1* | 5/2018 | Geisler | H04L 63/10 |
| 2020/0076818 | A1* | 3/2020 | Krishnan | H04L 63/105 |

* cited by examiner

*Primary Examiner* — Kris E Mackes
(74) *Attorney, Agent, or Firm* — Austin Rapp

(57) ABSTRACT

A method is described. The method includes generating an access model that simulates a transformation of existing new technology file system (NTFS) permissions for a plurality of shared folders. The method also includes creating permission groups for the plurality of shared folders based on the access model. The method further includes updating the NTFS permissions of the shared folders based on the access model and permission groups.

28 Claims, 11 Drawing Sheets

SYSTEMS AND METHODS FOR CORRECTING FILE SYSTEM PERMISSIONS

TECHNICAL FIELD

The present disclosure relates generally to computers and computer-related technology. More specifically, the present disclosure relates to systems and methods for correcting file system permissions.

BACKGROUND

The use of electronic devices has become an everyday use in modern society. The use of electronic devices has increased as the cost of electronic devices has declined. The capabilities of electronic devices have also increased and allow people to use electronic devices in many different industries and for many different purposes. For example, electronic devices may be used to perform tasks at home, work or school. One type of an electronic device is a computer.

The technology being used in computers has been improving rapidly. Computers may range from small hand-held computing devices to desktop computer systems to large multi-processor computer systems. In some configurations, multiple computers may communicate in a network environment.

In computing technology, files may be stored within shared folders on servers across a network. These shared folders must be secured using permissions. However, these permissions may be applied directly to the folders and/or files on the file servers with no centralized management. This leaves an organization with a highly distributed set of shared folders, each with their own security applied. Benefits may be realized by correcting file system permissions in an automated manner.

DETAILED DESCRIPTION

A method is described. The method includes generating an access model that simulates a transformation of existing new technology file system (NTFS) permissions for a plurality of shared folders. The method also includes creating permission groups for the plurality of shared folders based on the access model. The method further includes updating the NTFS permissions of the shared folders based on the access model and permission groups.

Generating the access model may include comparing access control lists of the plurality of shared folders to simulate changes to the existing NTFS permissions. The method may also include applying a traverse group to ensure access of shared folders to a root share after updating the NTFS permissions.

The method may also include determining a scope of shared folders that are included in the access model. The method may also include assessing existing access of shared folders that are included in the access model.

Generating the access model may include removing inactive users from one or more shared folders. Generating the access model may include mapping users to a least-privileged permission group based on user activity. Generating the access model may include removing high risk trustees from the NTFS permissions.

A computing device is also described. The computing device includes a processor, a memory in electronic communication with the processor and instructions stored in the memory. The instructions are executable to generate an access model that simulates a transformation of existing NTFS permissions for a plurality of shared folders. The instructions are also executable to create permission groups for the plurality of shared folders based on the access model. The instructions are further executable to update the NTFS permissions of the shared folders based on the access model and permission groups.

A non-transitory, tangible computer-readable medium is also described. The computer-readable medium includes executable instructions for generating an access model that simulates a transformation of existing NTFS permissions for a plurality of shared folders. The computer-readable medium also includes executable instructions for creating permission groups for the plurality of shared folders based on the access model. The computer-readable medium further includes executable instructions for updating the NTFS permissions of the shared folders based on the access model and permission groups.

Figure 1:
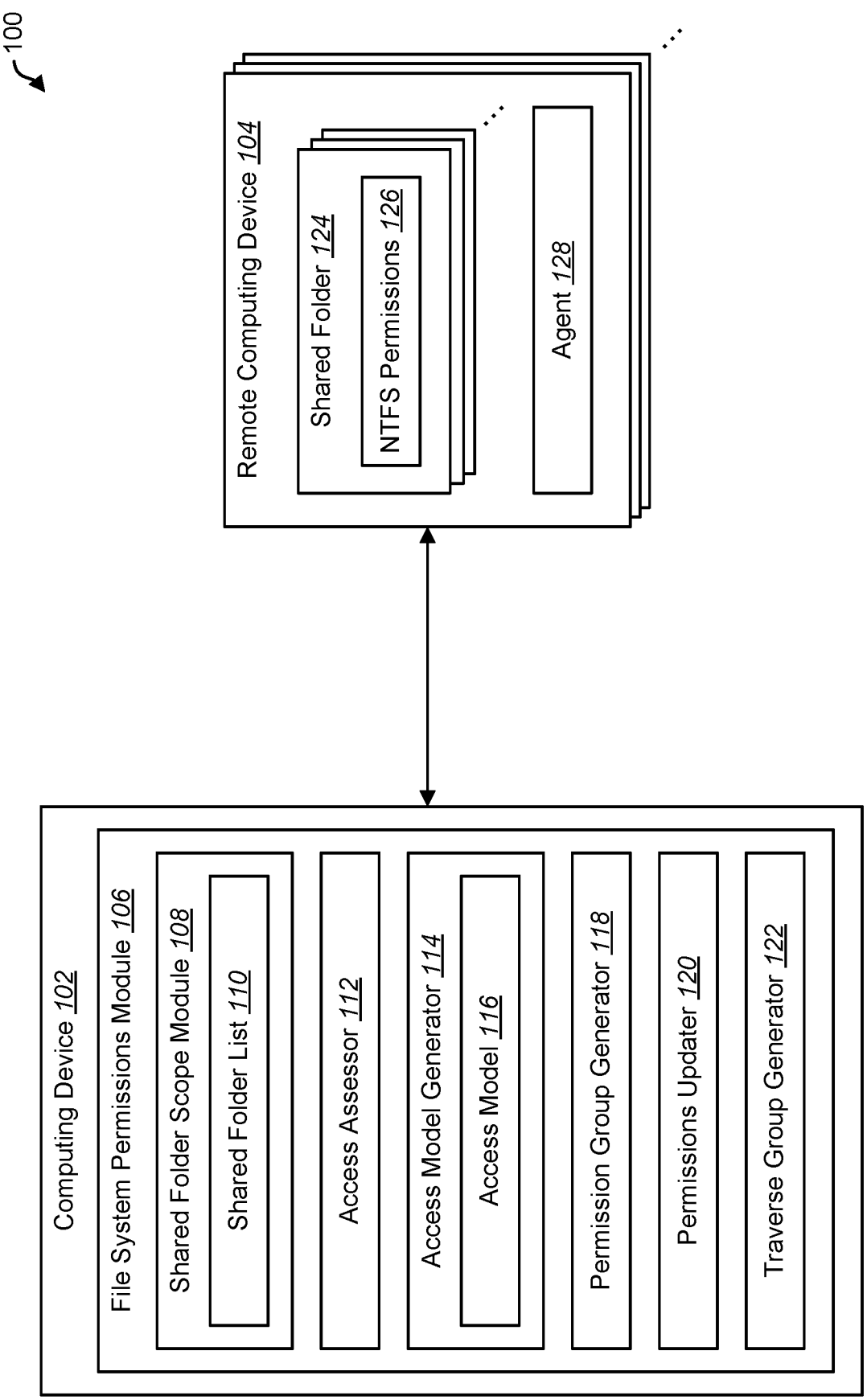
FIG. 1 is a block diagram illustrating one configuration of a computing device in which systems and methods for correcting file system permissions may be implemented.

FIG. 1 is a block diagram illustrating one configuration of a computing device 102 in which systems and methods for correcting file system permissions may be implemented. In particular, the systems and methods disclosed herein automate the granting, revoking, and modification of access to shared folders 124 in a predictable way.

Examples of the computing device 102 include a desktop computer, laptop computer, tablet computer, server, domain controller, etc. The computing device 102 may be configured to communicate in a network environment. In an implementation, the computing device 102 may be a desktop computer and/or server configured to run a Microsoft Windows operating system.

The computing device 102 may communicate with one or more remote computing devices 104 in a network 100. The remote computing devices 104 may include a shared folder 124.

Many organizations store files within shared folders 124 on servers across their network. A shared folder 124 is a shared resource (also referred to as a network share), which may be made available from one host to other hosts on a computer network. Files in a shared folder 124 may be accessible to one or more users on a network.

Shared folders 124 may be secured using permissions. For example, with Microsoft Windows-based shared folders 124, new technology file system (NTFS) permissions 126 may be applied to domain and/or local user accounts, domain and/or local groups, and security principals (e.g., NT AUTHORITY\Authenticated Users). In an example, when files get stored within shared folders 124 on servers within a corporate environment, there are permissions that secure those servers. Users access the files based on what permissions they have.

NTFS is a file system that may be used in the Microsoft Windows operating system. NTFS uses file system permissions 126 to assign access rights to specific users or groups of users. For example, NTFS permissions 126 may allow a user to view, change, navigate, and execute the contents of the file system. In NTFS, each file or folder may contain an access control list (ACL) that defines what type of interactions (e.g., reading, writing, executing or deleting) are allowed or forbidden by which user or groups of users. For example, files in the C:\Program Files folder may be read and executed by all users but modified only by a user holding administrative privileges. The file system permissions included in the ACL may be referred to as NTFS permissions 126.

These NTFS permissions 126 may be applied directly to the shared folders 124 and/or files on these file servers with no centralized management. It should be noted that the shared folders 124 are depicted on a remote computing device 104. However, in another implementation (not shown), one or more shared folders 124 may be hosted on the computing device 102.

The NTFS permissions 126 of a shared folder 124 leaves most organizations with a highly distributed set of shared folders 124, each with their own security applied. Most organizations must adopt processes for granting, revoking, and changing NTFS permissions 126 for users as they join, leave, and move throughout the organization. Because of the volume and distributed nature of shared folders 124, this can be a highly time-consuming, arduous, and error-prone process. Changing NTFS permissions 126 to a single shared folder 124 may impact access throughout the organization, because the groups applied to the NTFS permissions 126 of the shared folder 124 may have been reused in other areas.

In an example, an organization may have thousands of users and thousands of shared folders 124 that are hosted on a variety of remote computing devices 104. The organization may be sharing these folders 124 for different projects that are going on, or for different departments. Users may collaborate on a shared folder 124 for a project and all related project files may be located within a shared folder 124. The shared folder 124 may be secured with groups with certain NTFS permissions 126. For example, the users may belong to an engineering team. In this case, an engineering group may be created with NTFS permissions 126 for what and how files may be accessed.

A challenge occurs when granting permission to a user to access a shared folder 124 when the user does not belong to a user group. For example, User A may need access to the engineering shared folder 124, but User A may not belong to the engineering group. Instead, User A may belong to the accounting group. If all of the accounting group is granted permission to access the shared folder 124, then there may be sever users that can access the shared folder 124 when only one (User A) was desired. However, adding User A to the engineering group may grant more access to the engineering files than User A needs.

Furthermore, because user groups may be reused throughout the organization, if a group is assigned to one folder, and that group is assigned many other places, or reused over and over again, the owner of the shared folder 124 cannot make a change without impacting other areas. For example, an organization may not want to remove User A from the accounting group or add User A to the engineering group just to give User A access to this one file or shared folder 124. This would give users access to resources they do not need and/or restrict access from resources that they do need.

As can be observed, there is a need for automating the granting, revoking, and modification of shared folder access in a predictable way. Data access governance solutions may provide workflows for users to request access to shared folders 124, or for data owners to modify access to shared folders 124. However, without a reliable permission structure in place, those changes cannot be applied effectively. Organizations need a way to implement a proper permissions model to enable self-service access changes. Moreover, these organizations need to do this with their existing set of shared folders 124 and NTFS permissions 126 without breaking access during the implementation of a new automated process.

The systems and methods described herein allow each shared folder 124 to be managed independently of other access. Additionally, the modified shared folder access may be put in place without breaking the current access that is in place by taking the current access to these shared folders 124 and transforming it to a new access. This allows an organization to migrate from their existing, messy, duplicated model of shared folder access to a clean state where there is single-purpose access on shared folders 124. Furthermore, the process of creating and modifying shared folder access is simplified to permit a typical manager within an organization to manage access to certain shared folders 124 without breaking other access in the organization.

The systems and methods described herein solve this problem by transforming existing NTFS permissions 126 on Windows-based shared folders 124 to an access model 116 that allows full automation and self-service access changes. This approach migrates the existing NTFS permissions 126 to the new access model 116 and provides the intelligence necessary to ensure access is not broken during the migration. Moreover, this approach provides improved security during the transition to remove unsecure NTFS permissions 126 (e.g. Everyone) and removes users who no longer are using their access. Importantly, this workflow is done in bulk across many shared folders 124 and many remote computing devices 104 (e.g., file servers) at once, without the need to manually remediate a single shared folder 124 at a time.

The computing device 102 may include a file system permissions module 106 to create and update NTFS permissions 126 for one or more shared folders 124 based on an access model 116. The file system permissions module 106 may include a shared folder scope module 108. The shared folder scope module 108 may determine the scope of shared folders 124 for updating NTFS permissions 126. The shared folder scope module 108 may generate a shared folder list 110 that includes shared folders 124 that are selected for permission modification based on certain criteria.

The shared folder scope module 108 may allow a user to refine the shared folder list 110. In a large organization that includes many shared folders 124, a user may wish to modify access to certain shared folders 124 without modifying access to other shared folders 124. For example, a user may wish to modify access on all of the shared folders 124 in an engineering folder, but not the accounting shared folders 124. In another example, a user may wish to modify on one group of file servers, but not other file servers within the network 100.

Additionally, selecting a scope of shared folders 124 to target may improve the efficiency of correcting file system permissions 126. In a large organization, attempting to correct the file system permissions for the entire organization at once may impact performance of the network 100. However, it may be extremely time consuming to correct the file system permissions 126 one at a time. Therefore, the shared folder scope module 108 provides the ability to select a plurality of shared folders 124 to scan, which allows a flexible amount of shared folders 124 to be processed in a batch.

In one implementation, the shared folder list 110 that defines the scope of permissions processing may be determined based on a user-specified list of shared folders 124. In another implementation, the scope of the shared folder list 110 may be defined based on the depth of shared folders 124 within a directory. An example of determining the scope of shared folders 124 for updating NTFS permissions 126 is described in connection with FIG. 4.

Once the scope of the shared folders 124 is determined, the shared folder scope module 108 may generate the shared folder list 110. The shared folder list 110 may include multiple shared folders 124 that are selected to be scanned.

An access assessor 112 may assess existing access of the selected shared folders 124. It is beneficial to transform shared folder access so that users (e.g., owners, managers, etc.) can manage shared folders 124 without breaking other access. But this transformation should be done in a seamless transition. For example, if there are 100 users that can access a shared folder 124, these 100 users should keep access unless there is a reason to remove the access.

To determine how to modify NTFS permissions 126, the access assessor 112 determines who has access currently. To do that, the access assessor 112 may look at the current NTFS permissions 126. These NTFS permissions 126 may be for users, groups (e.g., groups of users and/or groups of other groups). The access assessor 112 may expand the groups to determine who can access the shared folders 124. In other words, the access assessor 112 may establish a baseline of effective access to the shared folders 124 in the shared folder list 110. An example of assessing existing access is described in connection with FIG. 5.

The file system permissions module 106 may also include an access model generator 114. Once the effective access is determined, the access model generator 114 may generate an access model 116 that simulates a transformation of existing NTFS permissions 126 for a plurality of shared folders 124. The access model 116 may compare current access to proposed access. In an implementation, the access model 116 may simulate removing inactive users. In another implementation, the access model 116 may simulate reducing access based on user activity patterns. In yet another implementation, the access model 116 may simulate removing high risk trustees (e.g., Everyone) from NTFS permissions 126. High risk trustees may also include NT AUTHORITY\Authenticated Users, and Domain Users. An example of access model generation is described in connection with FIG. 6.

In an implementation, an agent 128 may be installed on a remote computing device 104. The agent 128 may monitor user activity on the remote computing device 104 with regard to the shared folder 124. The agent 128 may monitor whether a user has accessed the shared folder 124. The agent 128 may also monitor activity patterns. For example, the agent 128 may monitor whether a user has ever made a change or added a file to the shared folder 124. This user activity data may be sent by the agent 128 to the computing device 102, which may save the user activity in a database. The access model generator 114 may use this stored user activity information when simulating changes to NTFS permissions 126.

The access model generator 114 may display the access model 116 for a user (e.g., manager) to review. The user may accept the proposed changes or may provide other criteria to generate the access model 116. For example, the user may change the conditions for granting or denying user access to a shared folder 124. The access model generator 114 may then re-generate the access model 116 using the new conditions.

The access model 116 may indicate the users that are going to lose access because they have not used a shared folder 124. These are the users that are going to have their access rights adjusted, because of their access patterns. The access model 116 may also present what the changes are going to be. For example, the access model 116 may indicate who is going to be included in new permission groups. A user may review the access model 116 and accept or decline the proposed changes.

The file system permissions module 106 may also include a permission group generator 118. The permission group generator 118 may create permission groups (e.g., Active Directory groups) for the selected shared folders 124 based on the access model 116. For example, the permission group generator 118 may create a read permission group, a read/write permission group and/or a full control permission group for each shared folder 124 in the shared folder list 110. Membership within these permission groups may be updated based on the results of the access model 116. In an implementation, the permission groups may be created based on a naming convention. An example of permission group generation is described in connection with FIG. 7.

The file system permissions module 106 may also include a permissions updater 120. The permissions updater 120 may update the NTFS permissions 126 for the generated permission groups. The permissions updater 120 may apply the new permission groups (e.g., read, read/write, full control permission groups) that were created to the shared folders 124.

The permissions updater 120 may also break the permission inheritance and may remove inherited permissions for the shared folders 124. In other words, the old NTFS permissions 126 may be disabled so that only the new NTFS permissions 126 based on the access model 116 are applied to the shared folder 124. For example, in Windows, a parent folder may have one or more folders (e.g., shared folders 124) within it. These subfolders may be referred to as a child folder. When a shared folder 124 is created, it inherits the rights of its parent folder. Whoever has access to the parent folder will have access to the one or more shared folders 124 within the parent.

In this case, the permissions updater 120 may secure a new shared folder 124 by breaking the inherited rights of the parent. Instead, a shared folder 124 may be secured as its own individual entity. Therefore, breaking inheritance means that permissions of the parent folder do not apply to the child shared folder 124. An example of updating the NTFS permissions 126 is described in connection with FIG. 8.

The file system permissions module 106 may also include a traverse group generator 122. When inheritance is broken, a user may only have access to a certain shared folder 124 and not the root share, parent or other intervening folders. For example, a user may have access to a given shared folder 124 that is 3 levels deep in the directory tree. Without permission to access the upper folders, the user may not be able to traverse to the given shared folder 124 using a mapping from the root share.

The traverse group generator 122 may apply a traverse group to the selected shared folders 124. The traverse group allows a user to navigate from a root share to a given shared folder 124 without granting permission to access content within intervening folders. A user can get a list of folders or subfolders of a root share. The user can then navigate down to the shared folder 124 that the user has access to. An example of applying a traverse group to a given shared folder 124 is described in connection with FIG. 9.

In an implementation, the file system permissions module 106 may be configured to roll back any changes to the NTFS permissions 126. For example, the file system permissions module 106 may save the state of NTFS permissions 126 prior to modifying the NTFS permissions 126. If a user wishes to revert to the earlier state of NTFS permissions 126, then the file system permissions module 106 may restore the earlier state of NTFS permissions 126.

One of the benefits of the described systems and methods is the ability to correct file system permissions in bulk across many systems (e.g., remote computing devices 104) rather than having to click through and update shared folders 124 one at a time. The remote computing devices 104 may be spread throughout a network 100. Additionally, file system permissions may be updated in bulk with an automated workflow that has best practices and security measures built right into it.

Converting existing file shares (i.e., shared folders 124) to a resource-based group model is typically an arduous manual process because of the steps involved. In an aspect, by programmatically comparing access control lists to past user behavior, the described systems and methods complete that task in a fast and automated fashion.

The described systems and methods provide a significant advantage by applying least-privileged resource-based groups in an automated fashion. The described systems and methods may be used to automate converting an organization's access control lists in bulk, saving the organization months or years of manual effort.

Figure 2:
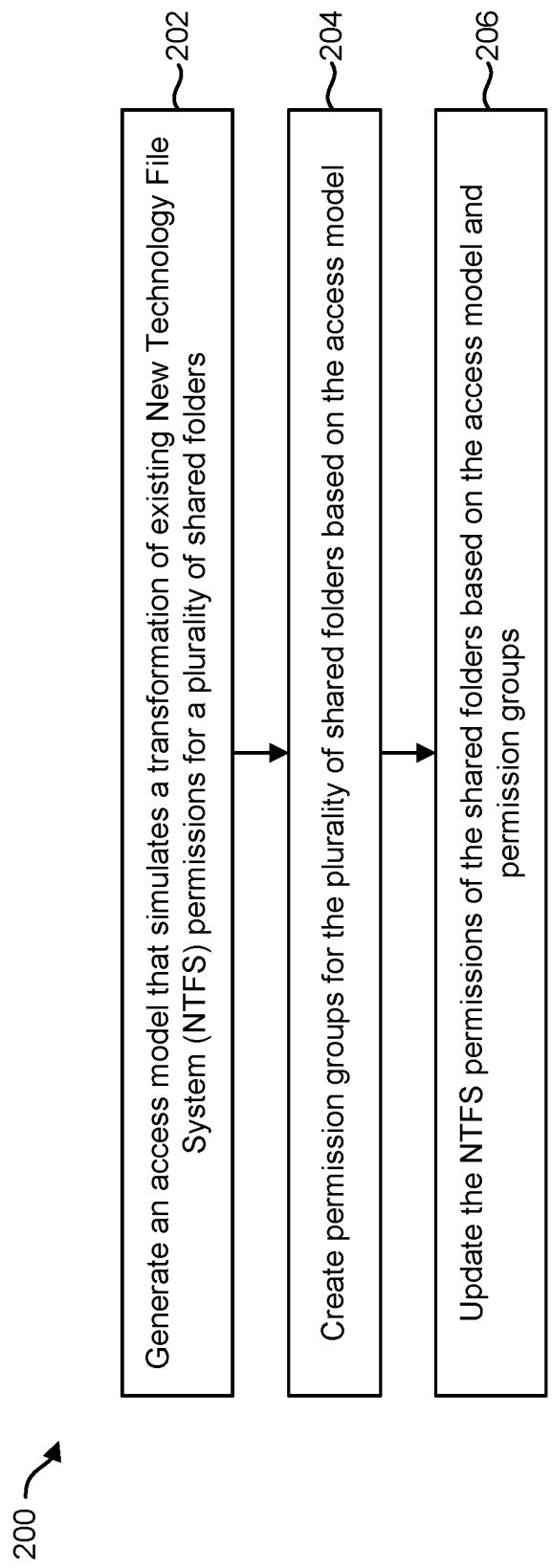
FIG. 2 is a flow diagram illustrating one configuration of a method for correcting file system permissions.

FIG. 2 is a flow diagram illustrating one configuration of a method 200 for correcting file system permissions. The method 200 may be implemented by a computing device 102. In an implementation, the computing device 102 may be an administrative server that is in communication with one or more remote computing devices 104.

The computing device 102 may generate 202 an access model 116 that simulates a transformation of existing new technology file system (NTFS) permissions 126 for a plurality of shared folders 124. The shared folders 124 may be hosted on one or more remote computing devices 104. The shared folders 124 may also be hosted on the computing device 102.

The computing device 102 may determine a scope of shared folders 124 that are included in the access model 116. For example, the computing device 102 may identify shared folders 124 in a specified folder list. In another approach, the computing device 102 may identify shared folders 124 based on a folder level depth. The identified shared folders 124 may be included in a shared folder list 110.

The computing device 102 may assess existing access of shared folders 124 that are included in the access model 116. For example, the computing device 102 may determine the users that have access to the shared folders 124 in the shared folder list 110 and the type of access (e.g., read, write, full control, etc.) that the users have.

The computing device 102 may generate 202 the access model 116 for the shared folders 124 in the shared folder list 110 based on the existing access. For example, users with read access may be mapped to a read permission group. Users with read/write access and/or full control may be mapped to a read/write permission group. The computing device 102 may model adding a full control permission group for administrative access.

The access model 116 may include removing inactive users from one or more shared folders 124. The access model 116 may also include mapping users to a least-privileged permission group based on user activity. The access model 116 may further include removing high risk trustees from the NTFS permissions 126.

The access model 116 may compare access control lists of the plurality of shared folders 124 to simulate changes to the existing NTFS permissions 126. For example, a user may review the access model 116 to determine what changes the computing device 102 would make to the NTFS permissions 126.

The computing device 102 may create 204 permission groups for the plurality of shared folders 124 based on the access model 116. For example, the computing device 102 may create 204 a read permission group, a read/write permission group and/or a full control permission group for each shared folder 124 included in the access model 116.

The computing device 102 may update 206 the NTFS permissions 126 of the shared folders 124 based on the access model 116 and permission groups. For example, the computing device 102 may update membership of the read permission group, read/write permission group and/or a full control permission group based on the access model 116. The computing device 102 may add the users to a corresponding permission group based on the access model 116.

Figure 3:
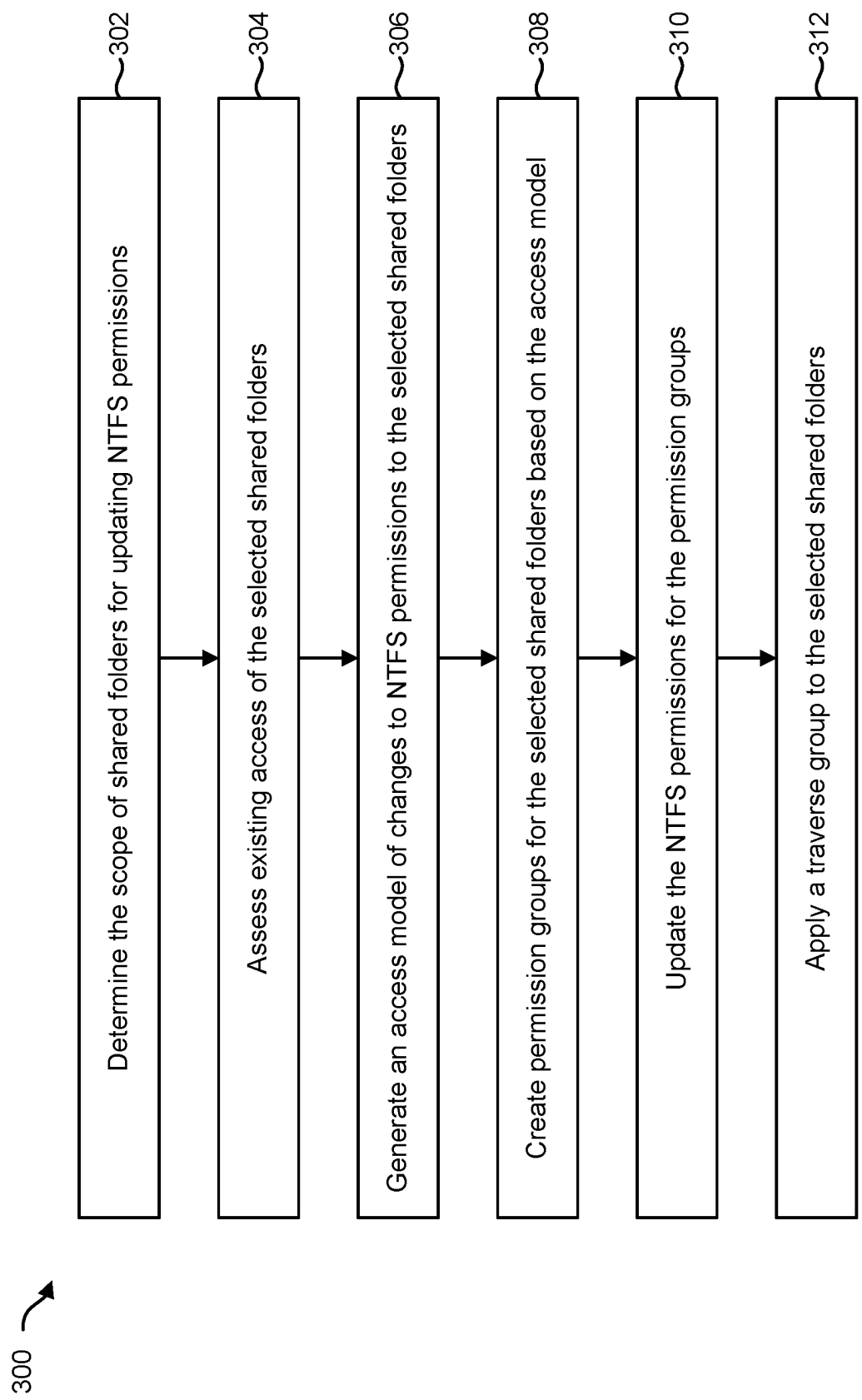
FIG. 3 is a flow diagram illustrating another configuration of a method for correcting file system permissions.

FIG. 3 is a flow diagram illustrating another configuration of a method 300 for correcting file system permissions. The method 300 may be implemented by a computing device 102.

The computing device 102 may determine 302 the scope of shared folders 124 for updating NTFS permissions 126. The scope of the shared folders 124 may include a limited set of shared folders 124 for further permissions scanning. The computing device 102 may generate a shared folder list 110 that includes the shared folders 124 that are selected for permissions scanning. The shared folder list 110 may define the shared folders 124 whose NTFS permissions 126 are secured in bulk.

In an approach, the computing device 102 may provide a user with the option to specify a list of folders. The user may select certain folders and the computing device 102 may identify shared folders 124 within the selected folders. In another approach, the computing device 102 may select shared folders 124 that are a certain depth n within a directory tree. The value of n may be configured by a user.

The computing device 102 may assess 304 existing access of the selected shared folders 124. The computing device 102 may enumerate share permissions (e.g., Server Message Block (SMB) permissions) and folder permissions (e.g., NTFS permissions 126). The computing device 102 may expand domain and/or local groups based on the enumerated permissions to determine the effective access of the shared folders 124 in the shared folder list 110. The effective access may include the users that currently have access to the shared folder 124 and what type of access (e.g., read, write, administrative, etc.) a user has.

The computing device 102 may generate 306 an access model 116 of changes to NTFS permissions 126 to the selected shared folders 124. For each of the shared folders 124 in the shared folder list 110, the computing device 102 may model a read permission group, a read/write permission group and/or a full control permission group. The computing device 102 may then map existing users to a permission group based on the effective access of the user. The computing device 102 may model removing inactive users and mapping users based on activity history. The computing device 102 may also model removing high risk trustees (e.g., Everyone).

The computing device 102 may display the results of the access model 116. A user may then review the access model 116 to determine what changes to the NTFS permissions 126 would be made. The user may accept or reject the access model 116.

If the user accepts the access model 116, then the computing device 102 may create 308 permission groups for the selected shared folders 124 based on the access model 116. For example, the computing device 102 may create a read permission group, a read/write permission group and/or a full control permission group for each of the shared folders 124 in the shared folder list 110. In an implementation, the computing device 102 may follow a uniform naming convention for the created permission groups. The computing device 102 may then add the users to a corresponding permission group based on the access model 116. For example, users with read-only access may be added to the read permission group, users with read/write permission may be added to the read/write permission group. Users and groups with full control rights may be added to the read/write permission group. The computing device 102 may add a configured user or group of users to the full control permission group.

The computing device 102 may update 310 the NTFS permissions 126 for the permission groups. The computing device 102 may apply the newly created permission groups to the corresponding shared folders 124. In an implementation, the computing device 102 may remove permissions that the shared folders 124 have inherited from a parent folder.

The computing device 102 may 312 apply a traverse group to the selected shared folders 124. The traverse group may allow a user to navigate from a root share to a given shared folder 124 without granting permission to access content within intervening folders.

Figure 4:
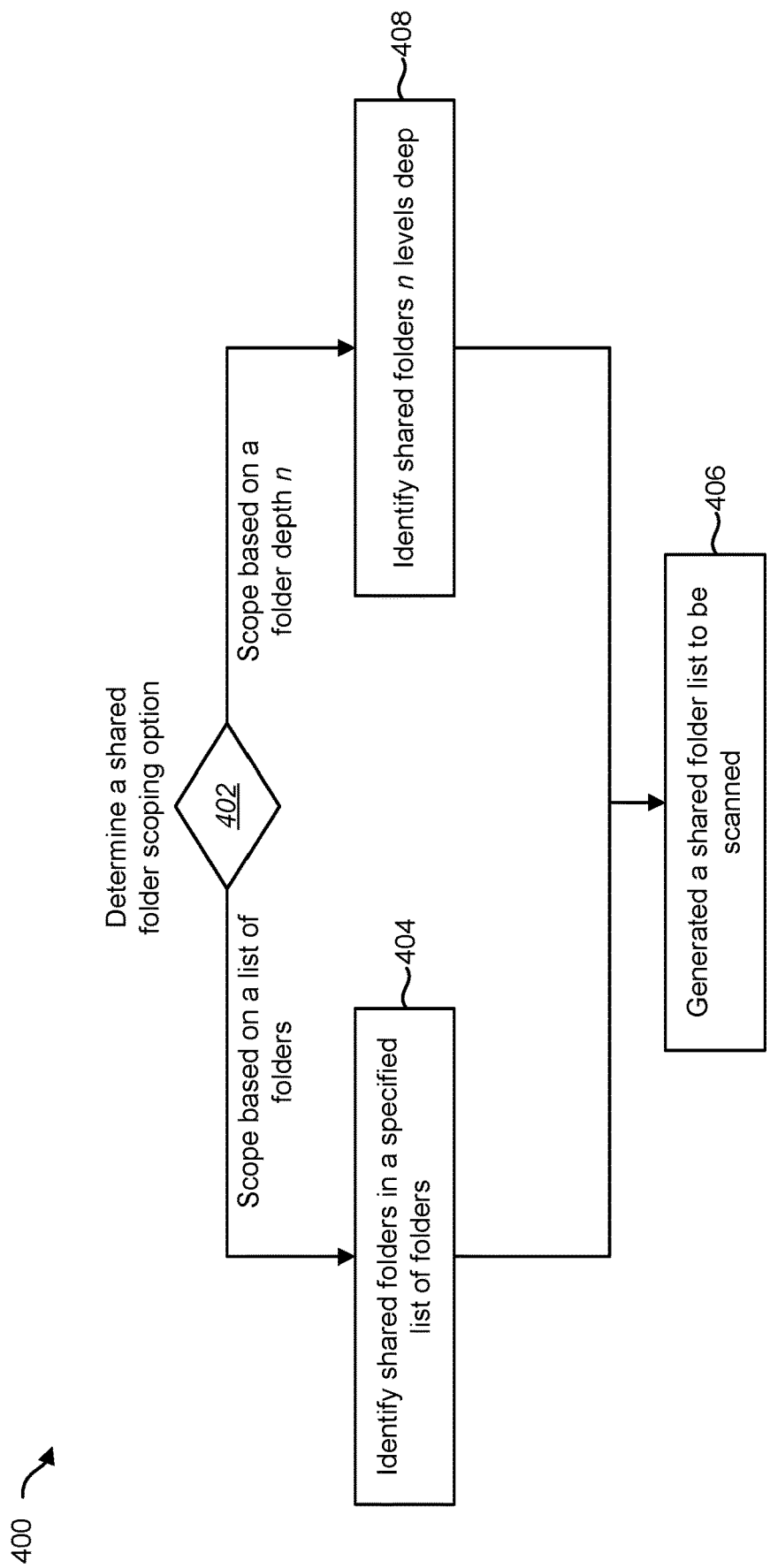
FIG. 4 is a flow diagram illustrating a method for determining the scope of shared folders for updating new technology file system (NTFS) permissions.

FIG. 4 is a flow diagram illustrating a method 400 for determining the scope of shared folders 124 for updating NTFS permissions 126. A computing device 102 may determine 402 a shared folder scoping option.

In a first approach, the scope may be based on a list of folders. A user may select one or more folders in a directory. The list of folders may be an ad hoc list of certain folders. For example, a user may select to update NTFS permissions 126 in all folders in an engineering directory or all folders in an accounting directory. In another example, a user may select folders on certain file servers, but not other file servers. The computing device 102 may receive a list of folders based on the user selection.

Upon receiving the list of folders, the computing device 102 may identify 404 shared folders 124 in the specified list. For example, the computing device 102 may filter files and/or folders within the specified list to determine which are shared folders 124.

The computing device 102 may generate 406 a shared folder list 110 to be scanned. For example, the computing device 102 may add the shared folders 124 that were identified based on the selected scoping option to a shared folder list 110. The shared folder list 110 may be passed on into the workflow described herein.

In a second approach, the scope may be based on folder depth. An organization may have a file structure in which shared folders 124 are stored within a certain depth n within a directory. For example, the top level share may be a "department" (e.g., engineering, finance, legal, etc.). Then those folders beneath that top level are for "projects" (e.g., legal project X, engineering project Y, etc.). In this case, a user may instruct the computing device 102 to look for shared folders 124 that are an integer number (e.g., 1, 2, 3, etc.) of levels deep. The user may also specify the top level share from which to search for shared folders 124. In this way, the computing device 102 can look at folders that are 2 levels deep or 10 levels deep, for example), and just secure those shared folders 124. In this way, the project level can be secured, because that is where access may need to be managed.

Upon receiving the list of folders, the computing device 102 may identify 408 shared folders 124 that are n levels deep. For example, the computing device 102 may filter files and/or folders that are n levels deep from a specified top level share to determine which are shared folders 124. The computing device 102 may then generate 406 a shared folder list 110 to be scanned.

Figure 5:
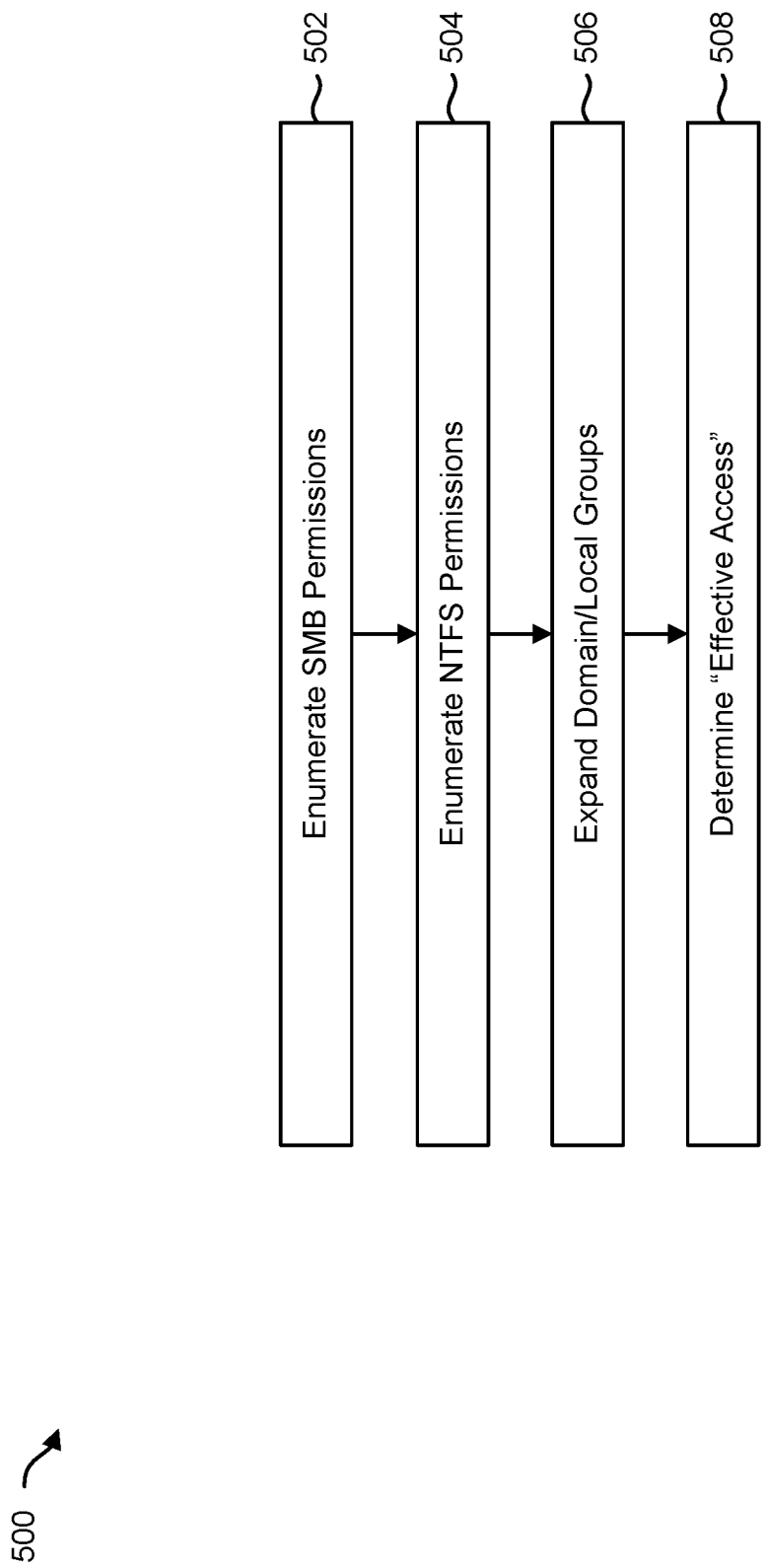
FIG. 5 is a flow diagram illustrating a configuration of a method for assessing existing access to shared folders.

FIG. 5 is a flow diagram illustrating a configuration of a method 500 for assessing existing access to shared folders 124. The method 500 may be implemented by a computing device 102.

The computing device 102 may receive a shared folder list 110. This shared folder list 110 may be generated as described in connection with FIG. 4.

Once the scope of shared folders 124 for updating NTFS permissions 126 has been determined, the computing device 102 may determine which users and/or groups have access to the shared folders 124 and what type of access a given user and/or group has.

The computing device 102 may enumerate 502 SMB permissions. The SMB permissions are share permissions that sit on top of NTFS permissions 126. The computing device 102 may list the SMB permissions for the shared folders 124 in the shared folder list 110.

The computing device 102 may enumerate 504 the NTFS permissions 126. For example, the computing device 102 may list the NTFS permissions 126 for the shared folders 124 in the shared folder list 110.

Once the SMB permissions and NTFS permissions 126 are enumerated, the computing device 102 may expand 506 domain and/or local groups. For example, the computing device 102 may determine which users belong to groups associated with a shared folder 124.

The computing device 102 may determine 508 effective access for the shared folder 124. For example, the computing device 102 may determine the type of access that a user has for a given shared folder 124. A user may have read, write and/or full control (e.g., administrative) access to a shared folder 124. Based on the enumerated SMB permissions, NTFS permissions 126 and expanded groups, the computing device 102 may determine 508 the type of access for each of the users of a shared folder 124. In other words, the computing device 102 may determine the current access of the shared folders 124 in the shared folder list 110. This effective access may be used as a baseline of who can access the shared folders 124.

Figure 6:
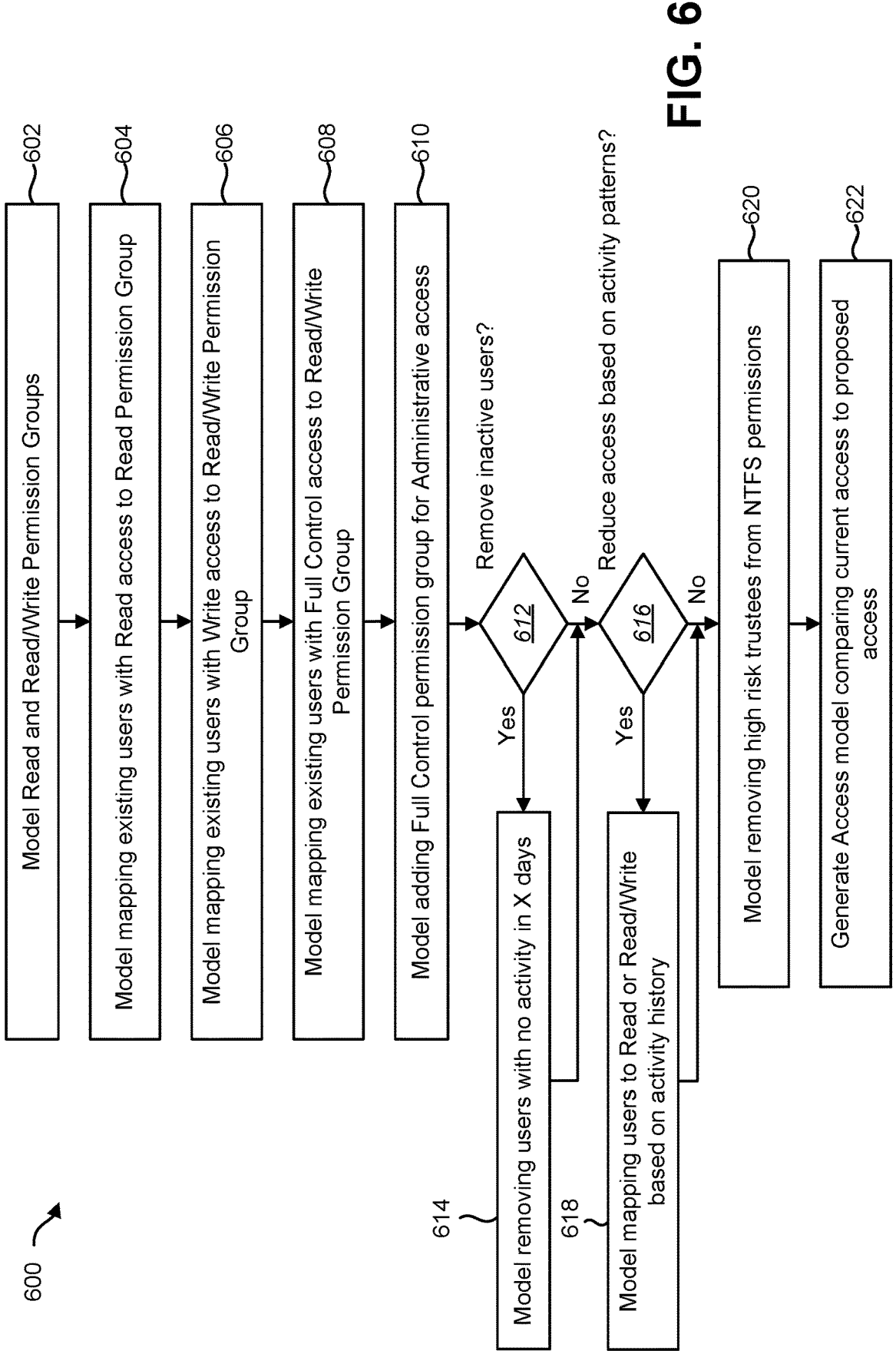
FIG. 6 is a flow diagram illustrating a configuration of a method for access model generation.

FIG. 6 is a flow diagram illustrating a configuration of a method 600 for access model generation. The method 600 may be implemented by a computing device 102. The computing device 102 may determine a shared folder list 110, as described in connection with FIG. 4. The computing device 102 may determine effective access of the shared folders 124 in the shared folder list 110, as described in connection with FIG. 5.

The computing device 102 may model 602 read permission groups and read/write permission groups. For example, the computing device 102 may model creating a read permission group and a read/write permission group for each of the shared folders 124 in the shared folder list 110.

The computing device 102 may model 604 mapping existing users with read access to the read permission groups. For example, for each of the shared folders 124 in the shared folder list 110, the computing device 102 may use the effective access to determine which users have read access to a given shared folder 124. The computing device 102 may model 604 mapping those users with read access to the read permission group for the given shared folder 124. In other words, the computing device 102 may simulate adding the users with read access to the read permission group for the given shared folder 124.

The computing device 102 may model 606 mapping existing users with write access to the read/write permission groups. For example, for each of the shared folders 124 in the shared folder list 110, the computing device 102 may use the effective access to determine which users have write access to a given shared folder 124. The computing device 102 may model mapping those users with write access to the read/write permission group for the given shared folder 124. In other words, the computing device 102 may simulate adding the users with write permission to the read/write permission group for the given shared folder 124.

The computing device 102 may model 608 mapping existing users with full control access to the read/write permission group. For example, users with full control of a shared folder 124 may be downgraded to the read/write permission group. It should be noted that this step may be used to protect a shared folder 124 from unnecessary and/or unknown full access.

The computing device 102 may model 610 adding a full control permission group for administrative access. This full control permission group may be certain users that are designated to have full control access to manage the shared folder 124. For example, the full control permission group may include one or more administrative accounts (e.g., users) that may manage the shared folder 124. Therefore, there may be at least one administrator that has full control access for the shared folders 124.

The computing device 102 may determine 612 whether to remove inactive users. If the computing device 102 is instructed (by a user, for instance) to remove inactive users, the computing device 102 may model 614 removing users with no activity in X days, where X is a configurable number of days. The computing device 102 may receive information from an agent 128 about user activity on a shared folder 124. The computing device 102 may determine if a user has been granted access (e.g., via NTFS permissions 126) to a shared folder 124, but has not accessed the shared folder 124 within the configured timeframe X. In the case that a user has not accessed the shared folder 124 within the configured timeframe X, the computing device 102 may remove the user's NTFS permissions 126 to access the shared folder 124.

In an example, if User A has access to a shared folder 124, but has never used that access (e.g., User A has never logged in, never made a change or added a file to this shared folder 124), the computing device 102 may remove User A's access to the shared folder 124. In this case, the computing device 102 may limit access to a shared folder 124 to users that are actively using their access.

The computing device 102 may determine 616 whether to reduce access based on activity patterns. If the computing device 102 is instructed (by a user, for instance) to reduce access based on activity patterns, the computing device 102 may model 618 mapping users to a read permission group or a read/write permission group based on activity history. The activity history may include how a user accesses files on a shared folder 124. The computing device 102 may determine what privileges a user uses to access the shared folders 124 over a period of time.

The computing device 102 may map a user to a least privileged permission group based on how the user accesses the shared folder 124. In an implementation, the computing device 102 may model restricting the NTFS permissions 126 of a user to the maximum permission level used within a time period. In an example, User A may only read files in a shared folder 124, but User A may actually have the ability to read and write. However, User A may never write the file to this directory. The computing device 102 may move User A down to the read permission group (i.e., read-only access), so that User A can still do what he has been doing for a time period (e.g., the past 3 months, or year), but no more than that. In this way, the computing device 102 may implement a least privilege model on top of the shared folder 124.

The computing device 102 may model 620 removing high risk trustees from NTFS permissions 126. For example, the computing device 102 may remove an "everyone" designation from the NTFS permissions 126 that would leave the shared folders 124 unsecured.

The computing device 102 may then generate 622 an access model 116 comparing current access to proposed access. The access model 116 may be displayed for a user to review before committing to changing the NTFS permissions 126.

Figure 7:
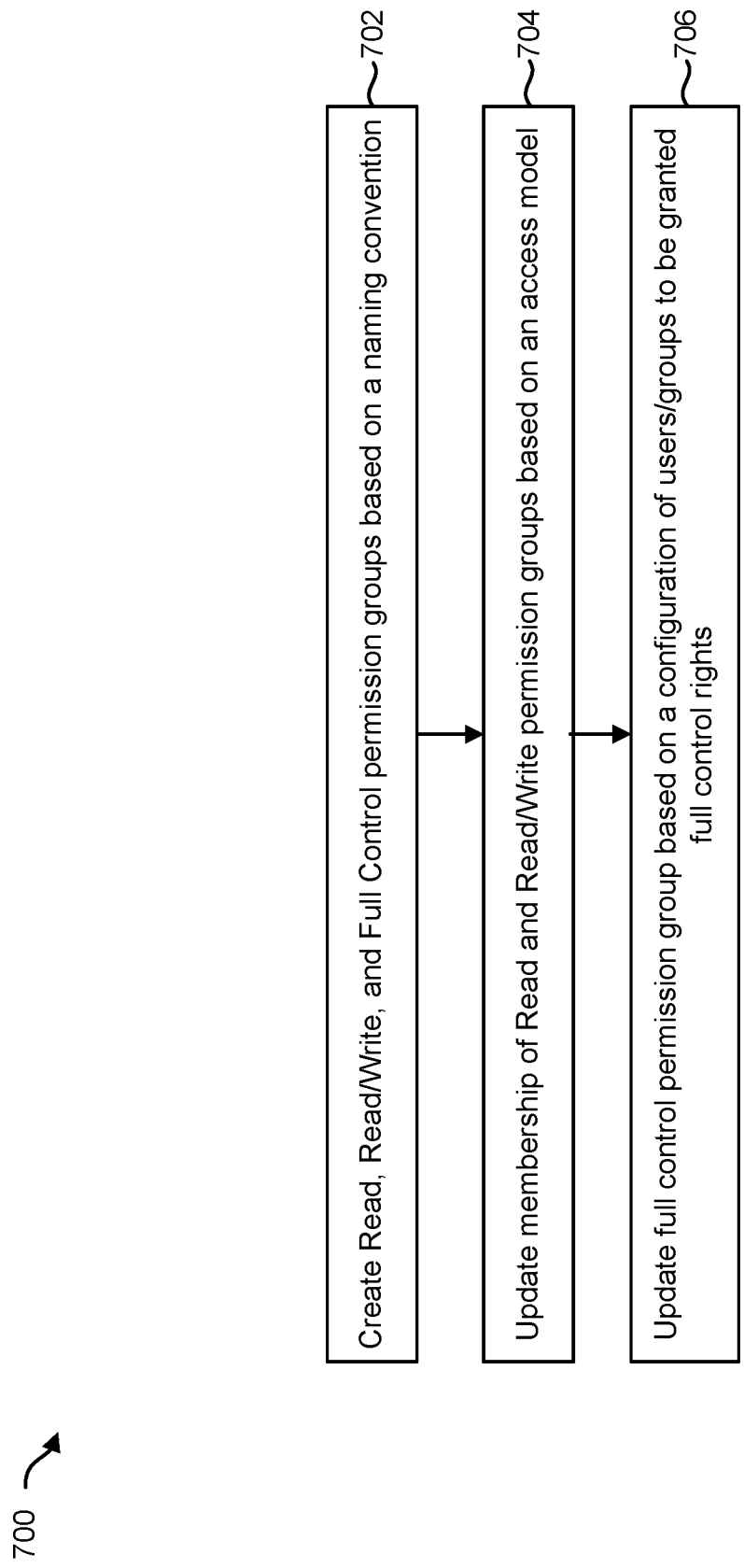
FIG. 7 is a flow diagram illustrating a configuration of a method for permission group generation.

FIG. 7 is a flow diagram illustrating a configuration of a method 700 for permission group generation. The method 700 may be implemented by a computing device 102. The computing device 102 may receive an access model 116 for modifying NTFS permissions 126. The access model 116 may be generated as described in connection with FIG. 6.

The computing device 102 may create 702 a read permission group, a read/write permission group and/or a full control permission group based on a naming convention. The computing device 102 may create 702 a read permission group, a read/write permission group and/or a full control permission group for each of the shared folders 124 in the access model 116. The created permission groups may be Active Directory groups.

When creating 702 the permission groups, the computing device 102 may use a configurable naming convention to clearly indicate the function of the permission group. The naming convention may make the name of the permission groups self-explanatory. In an implementation, the name of the permission groups may include the name of the server, the name of the shared folder 124 and the type of permission group. For example, a read permission group for shared folder A on Server A may be named "ServerA_Folder-A_Read." A read/write permission group for shared folder A on Server A may be named "ServerA_FolderA_ReadWrite." A full control permission group for shared folder A on Server A may be named "ServerA_FolderA_FullControl."

The computing device 102 may update 704 membership of the read permission group and read/write permission group based on the access model 116. For example, the computing device 102 may map the current users to the read permission group and read/write permission group based on how the user was mapped in the access model 116.

The computing device 102 may update 706 the full control permission group based on the configuration of users and/or groups to be granted full control rights. For example, the computing device 102 may map the users and/or groups that are designated to have full control of a given shared folder 124 to the full control permission group of that shared folder 124. It should be noted that at this point, there are groups in an active directory that are named in a consistent and clear manner. These groups now include the correct members.

Figure 8:
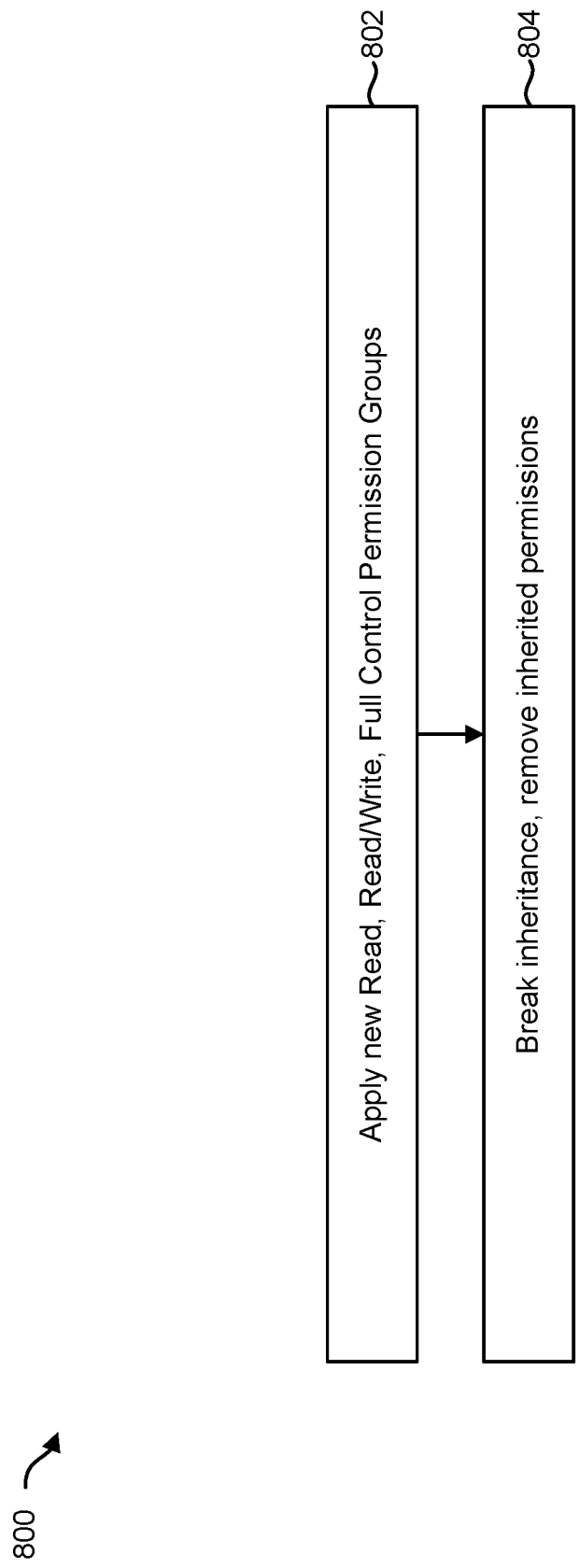
FIG. 8 is a flow diagram illustrating a configuration of a method for updating the NTFS permissions based on an access model.

FIG. 8 is a flow diagram illustrating a configuration of a method 800 for updating the NTFS permissions 126 based on an access model 116. The method 800 may be implemented by a computing device 102. The computing device 102 may receive an access model 116 for modifying NTFS permissions 126. The access model 116 may be generated, as described in connection with FIG. 6. A read permission group, a read/write permission group and/or a full control permission group may be created for each shared folder 124 in the access model 116, as described in connection with FIG. 7.

The computing device 102 may apply 802 the new read permission groups, read/write permission groups and/or full control permission groups. For example, the computing device 102 may activate the NTFS permissions 126 for the newly created permission groups. The read permission groups may be activated with read access in the NTFS permissions 126. The read/write permission groups may be activated with write access in the NTFS permissions 126. The full control permission groups may be activated with full control access in the NTFS permissions 126.

At this point, the new permission groups are active side by side with the old permission groups. In an implementation, there is the option to have a period of coexistence, if a user wants to apply the new permission groups without removing the old permission groups.

The computing device 102 may break 804 inheritance and may remove inherited permissions. If the old permission groups are to be deactivated, then the computing device 102 may set a flag indicating that the shared folders 124 no longer inherit permissions. The computing device 102 may also remove any inherited permissions for the shared folders 124 so that there are just the NTFS permissions 126 of the new permission groups are applied on the shared folders 124.

Figure 9:
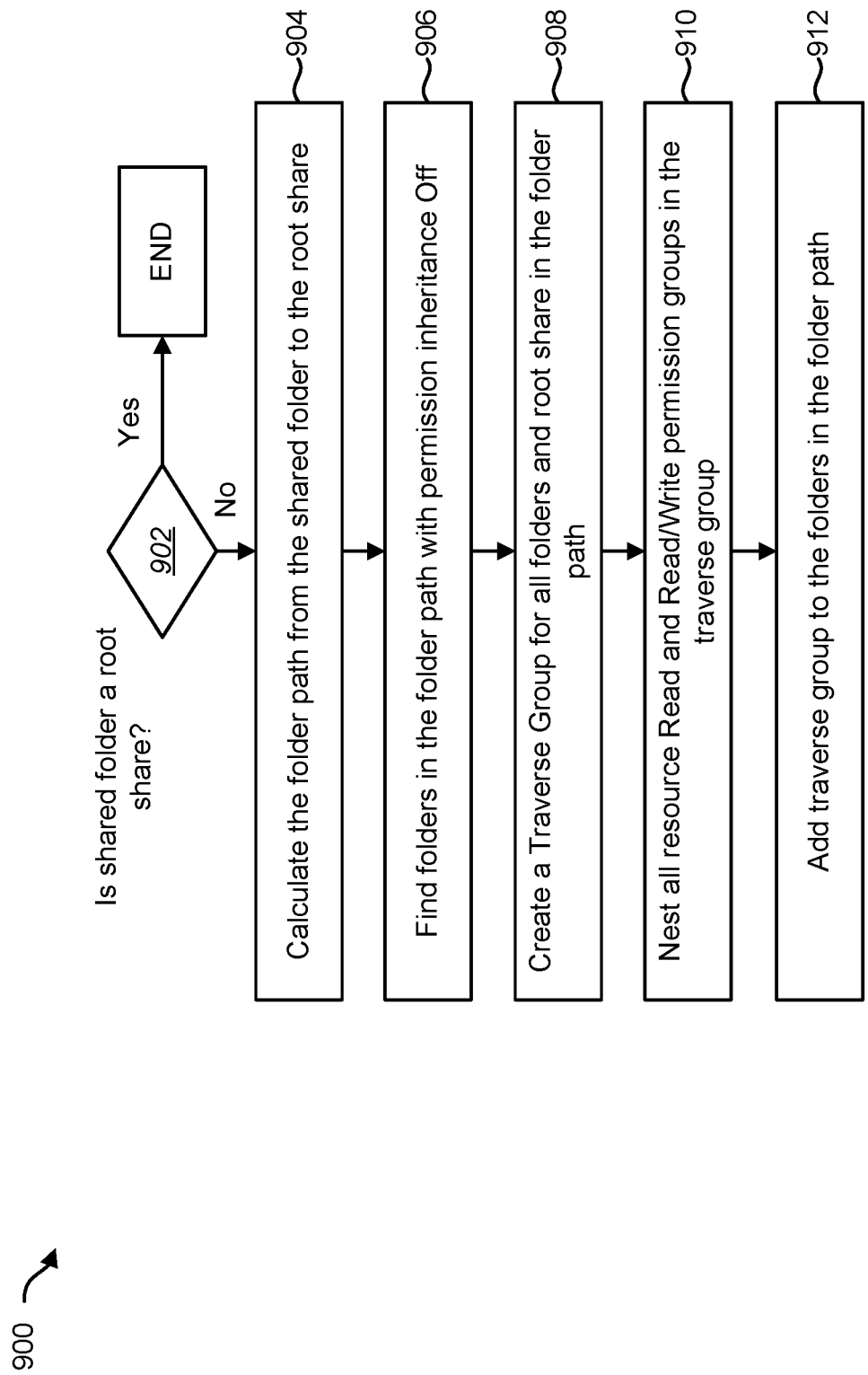
FIG. 9 is a flow diagram illustrating a configuration of a method for applying a traverse group to a given shared folder.

FIG. 9 is a flow diagram illustrating a configuration of a method 900 for applying a traverse group to a given shared folder 124. The method 900 may be implemented by a computing device 102. The computing device 102 may create permission groups for shared folders 124 according to an access model 116 as described above. The computing device 102 may apply NTFS permissions 126 to the created permission groups according to the access model 116 as described above.

If the computing device 102 turns off permission inheritance for a shared folder 124, a user may not be able to navigate from a higher folder level down to the shared folder 124. To allow a user to traverse from higher folder levels to the shared folder 124, the computing device 102 may create a traverse group for the shared folder 124.

The computing device 102 may determine 902 whether a shared folder 124 is a root share. If the shared folder 124 is a root share, then this is the highest folder level and no traverse group is needed. In this case, the method 900 ends.

If the shared folder 124 is not a root share, then the computing device 102 may calculate 904 the folder path from the shared folder 124 to the root share. The computing device 102 may find 906 folders in the folder path with permission inheritance off.

If the shared folder 124 and/or a higher folder in the folder path has permission inheritance off, then the computing device 102 may create 908 a traverse group for all folders and root share corresponding to the folder path of the shared folder 124. The traverse groups may be created 908 in Active Directory.

The computing device 102 may nest 910 all resource read permission groups and read/write permission groups in the traverse group. For example, the computing device 102 may add the read permission group and read/write permission group for a given shared folder 124 to the traverse group. The computing device 102 may then add 912 the traverse group to the folders in the folder path. The users that are included in the traverse group may be allowed to list the content of a parent folder, but may only access (e.g., read/write) the content based on their NTFS permissions 126 for that parent folder.

In an example, if a user is given access to a "Product Management/Beta" shared folder 124, then by default, the computing device 102 would create and apply a traverse group on the "Product Management" level. The traverse group may be called "Product Management List." Any user that gets added to a subfolder here, that group also gets added into the "Product Management List." The traverse group in the "Product Management" level only gives a user the ability to list the contents within the "Product Management" level. The user cannot actually open anything. The user only gets rights to open content when they get to the folder where they have been granted access, which in this case is inside the "Product Management/Beta" shared folder 124.

Figure 10:
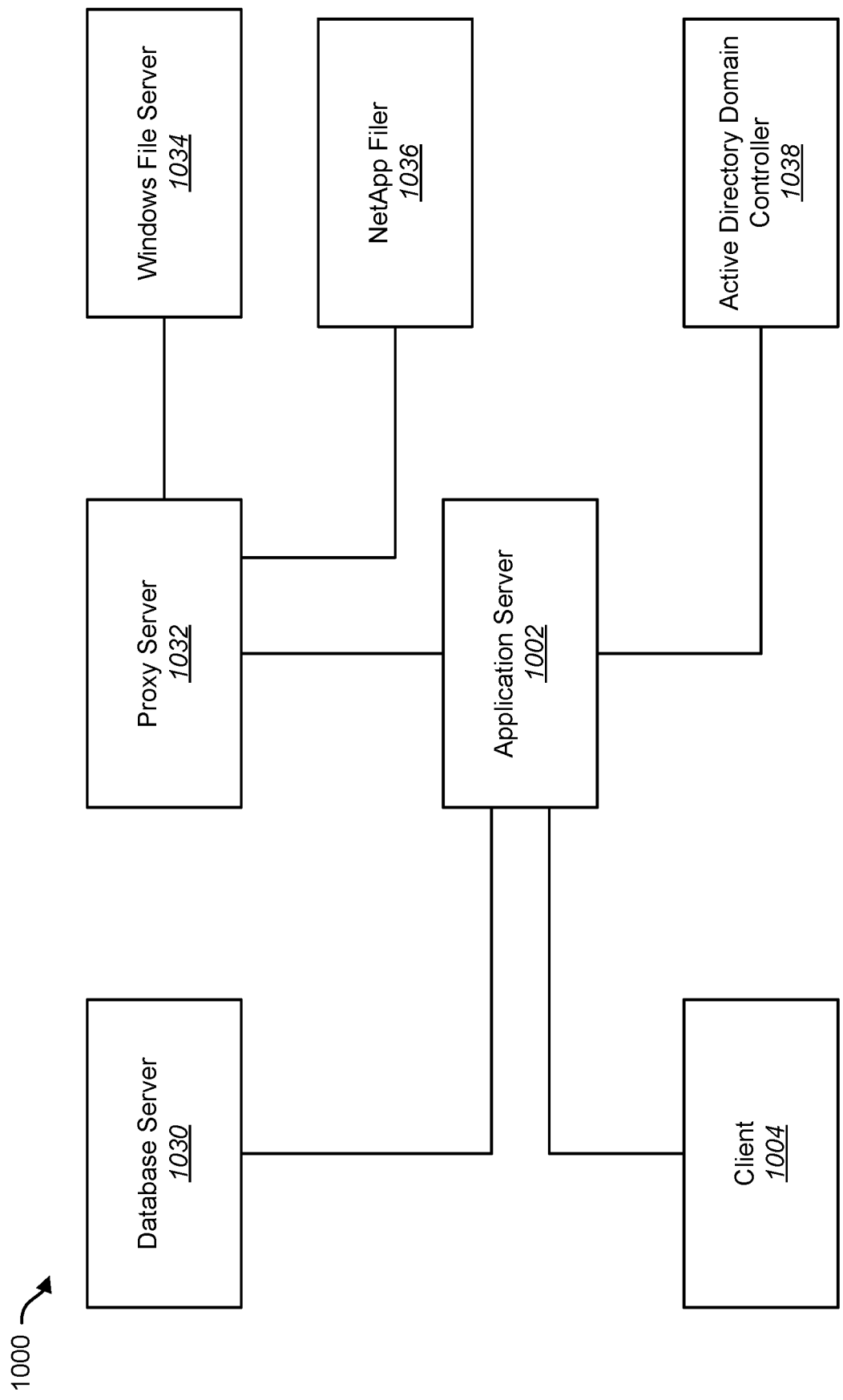
FIG. 10 is a block diagram illustrating one configuration of a network where systems and methods for correcting file system permissions may be implemented.

FIG. 10 is a block diagram illustrating one configuration of a network 1000 where systems and methods for correcting file system permissions may be implemented. An application server 1002 may be connected to one or more client computing devices 1004. The application server 1002 may also be connected to one or more database servers 1030 and one or more Active Directory domain controllers 1038.

The application server 1002 may also be connected to a proxy server 1032. The proxy server 1032 may be connected to one or more windows file servers 1034 and one or more NetApp filers 1036.

The application server 1002 may be implemented in accordance with the computing device 102 described in connection with FIG. 1. For example, the application server 1002 may implement a file system permissions module 106 for correcting NTFS permissions 126 as described herein. The shared folders 124 may be hosted on one or more of the client computing devices 1004, database server 1030, Windows file server 1034 and/or NetApp filer 1036. FIG. 10 illustrates only one possible configuration of a network 1000. Various other architectures and components may be utilized.

In an implementation, an action module may be installed in different data centers in a distributed architecture. The application server 1002 may act as a central console that can call these data centers across the globe and give them instructions to go and remediate the shared folders 124. This allows for bulk permissions remediation across a large area and many servers at the same time.

Figure 11:
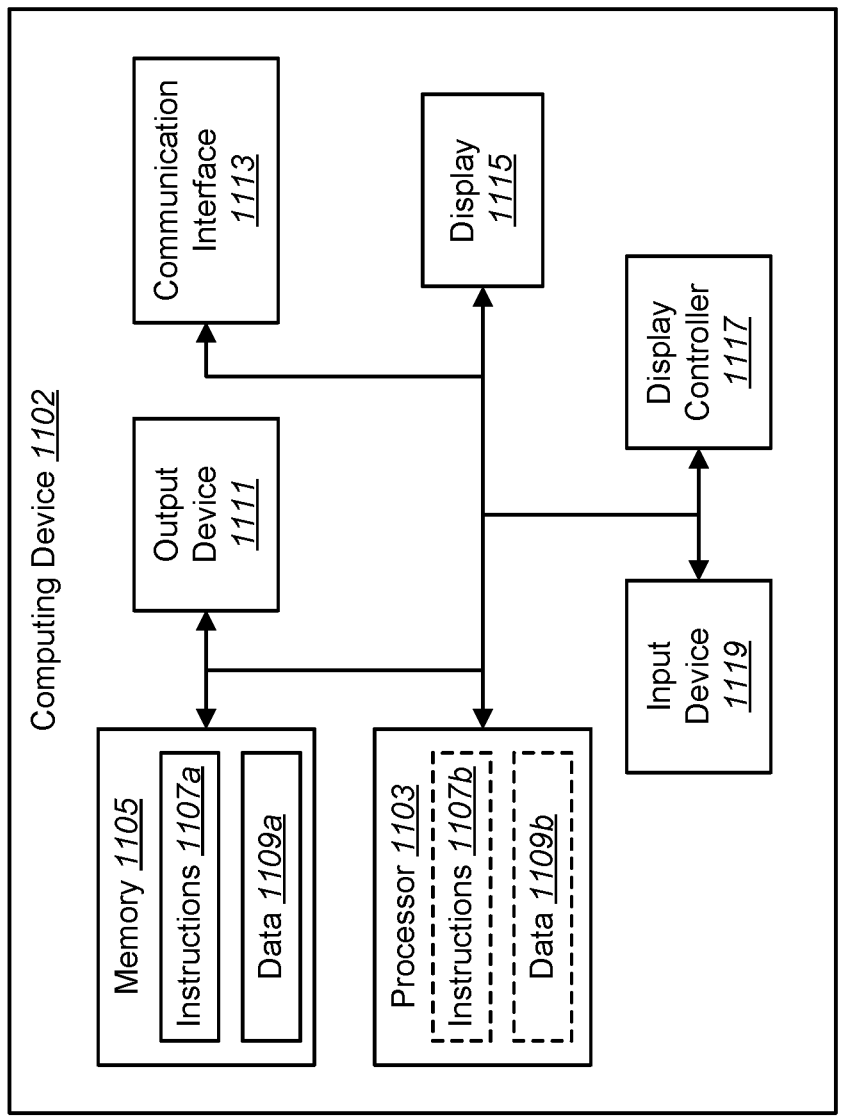
FIG. 11 is a block diagram illustrating components that may be utilized by a computing device.

FIG. 11 is a block diagram illustrating components that may be utilized by a computing device 1102. The computing device 1102 may be configured for correcting file system permissions as described herein.

The computing device 1102 may communicate with other electronic devices through one or more communication interfaces 1113. Communication through the communication interface 1113 may be achieved through different methods such as wired communication, wireless communication or both wired and wireless communication. For example, the communication interface 1113 may be a serial port, a parallel port, a Universal Serial Bus (USB), an Ethernet adapter, an Institute of Electrical and Electronics Engineers (IEEE) bus interface, a small computer system interface (SCSI) bus interface, an infrared (IR) communication port, a Bluetooth wireless communication adapter and so forth.

The computing device 1102 may receive and transmit information through one or more input devices 1119 and one or more output devices 1111. The input devices 1119 may be a keyboard, mouse, microphone, remote control device, button, joystick, trackball, touchpad, lightpen, etc. The output devices 1111 may be a speaker, printer, etc. A display device 1115 is an output device 1111 that may be included in a computer system. Display devices 1115 may project information through different technologies, such as liquid crystal display (LCD), light-emitting diode (LED), gas plasma, electroluminescence, a cathode ray tube (CRT) or the like.

A processor 1103 controls the operation of the computing device 1102 and may be a microprocessor, a microcontroller, a digital signal processor (DSP) or other device known in the art. A memory 1105 may be included in the computing device 1102 and includes instructions 1107a and data 1109a to assist the processor 1103 in operating the computing device 1102. The memory 1105 may send program instructions 1107b and/or data 1109b to the processor 1103 in order for the processor 1103 to perform logical and arithmetic operations according to methods disclosed herein. The processor 1103 may execute one or more of the instructions stored in the memory 1105 to implement one or more of the systems and methods disclosed herein.

Data 1109a stored in the memory 1105 may be converted to text, graphics and/or moving images (as appropriate) by a display controller 1117. Of course, FIG. 11 illustrates only one possible configuration of a computing device 1102. Various other architectures and components may be utilized.

In an implementation, the computing device 1102 may be a headless server. For example, the computing device 1102 may be configured to provide services to other computing devices with or without peripheral input/output interfaces.

In another implementation, the computing device 1102 may be configured to run on desktop and server hardware, both physical and virtual. In yet another implementation, the computing device 1102 may be configured to run desktop and server Microsoft Windows operating systems.

In this application, various terms have been connected to reference numbers. The reference numbers are for an element in the one or more Figures. If a term is not connected to a reference number, the term is meant more generally and without limitation to any particular Figure.

In this application, the term "determining" has been used. The term "determining" is meant to cover several different actions and, therefore, some examples of "determining" are computing, calculating, processing, investigating, looking up (e.g., looking up in a table, a database or another data structure), ascertaining and the like. The term "determining" also covers resolving, selecting, choosing, establishing and the like. The term "determining" can also cover receiving information or accessing information.

In this application, the term "based on" means more than "based only on," except where expressly stated. The term "based on" describes both "based only on" and "based at least on."

In this application, the term "processor" is meant to be broadly interpreted and covers a general purpose processor, a central processing unit (CPU), a microprocessor, a digital signal processor (DSP), a controller, a microcontroller, a state machine, and so forth, including virtual. Under some circumstances, a "processor" may refer to an application specific integrated circuit (ASIC), a programmable logic device (PLD), a field programmable gate array (FPGA), etc. The term "processor" may also be a combination of several processing devices, e.g., a combination of a DSP and a microprocessor, a plurality of microprocessors, one or more microprocessors in conjunction with a DSP core, or any other such configuration.

In this application, the term "memory" is meant to be broadly interpreted and covers electronic storage devices capable of storing information electronically. The term "memory" covers various types of memory technology such as programmable read-only memory (PROM), random access memory (RAM), read-only memory (ROM); erasable programmable read only memory (EPROM), non-volatile random access memory (NVRAM), electrically erasable PROM (EEPROM), flash memory, magnetic or optical data storage, registers, etc. A processor and memory are in electronic communication, where the processor can read or write information located within the memory. Memory that is integral to a processor is in electronic communication with the processor.

In this application, the terms "instructions" and "code" are meant to be broadly interpreted and cover code or statements that are computer-readable. For example, the terms "instructions" and "code" may cover programs, routines, sub-routines, functions, procedures, etc. of assembly language code or intermediate language code.

In this application, the term "computer-readable medium" covers any available medium that a computer or processor can access. For example, a computer-readable medium may comprise optical disk storage such as RAM, ROM, EEPROM, CD-ROM, any magnetic disk storage devices, or any other medium for carrying or storing instructions and code that can be accessed by a computer or processor. A computer-readable medium may be non-transitory and tangible. The terms "disk" and "disc" cover compact disc (CD), laser disc, optical disc, digital versatile disc (DVD), floppy disk and Blu-ray® disc disks typically are used for data magnetically accessible, and discs typically are used for data optically accessible through lasers.

Instructions and code may be transmitted over a transmission medium. Instructions and code may also be called software. For example, software may be transmitted from a website, server, or other remote source. The transmission medium may be a coaxial cable, fiber optic cable, twisted pair, digital subscriber line (DSL), or wireless technologies such as infrared, radio, and microwave.

In this application, the methods comprise steps or actions for achieving the functions and processes described above. The method steps are to be understood as interchangeable with one another. The interchanging of a step is not to be understood as departing from the scope of the claims. In this application, the order of steps and actions may be modified and not depart from the scope of the claims, unless a specific order is stated for the steps or actions being described.

The claims are to be understood to not be limited to the exact configuration and components discussed above. The claims are to be understood to cover any reasonable modifications, changes and variations of the arrangement, operation and details of the systems, methods, and apparatus described herein.

What is claimed is:

1. A method, comprising:
   determining existing Server Message Block (SMB) permissions and existing new technology file system (NTFS) permissions for a plurality of shared folders;
   expanding domain permission groups and local permission groups for the plurality of shared folders to determine existing users associated with the plurality of shared folders;
   determining access of the existing users to the plurality of shared folders based on the existing SMB permissions and the existing NTFS permissions;
   generating an access model that simulates a transformation of the existing NTFS permissions for the plurality of shared folders, the access model comprising proposed changes to the existing NTFS permissions, wherein the access model maps existing users with read access to read permission groups, the access model maps existing users with write access to read/write permission groups, and the access model downgrades existing users with full control access to the read/write permission groups;
   displaying the access model to present the proposed changes to the existing NTFS permissions;
   creating permission groups for the plurality of shared folders based on the access model in response to a user accepting the proposed changes; and
   updating the NTFS permissions of the shared folders based on the access model and permission groups, wherein the updated NTFS permissions break permission inheritance of the existing NTFS permissions for the plurality of shared folders.

2. The method of claim 1, wherein generating the access model comprises comparing access control lists of the plurality of shared folders to simulate changes to the existing NTFS permissions.

3. The method of claim 1, further comprising applying a traverse group to ensure access of shared folders to a root share after updating the NTFS permissions.

4. The method of claim 1, further comprising determining a scope of shared folders that are included in the access model.

5. The method of claim 1, further comprising assessing existing access of shared folders that are included in the access model.

6. The method of claim 1, wherein generating the access model comprises removing inactive users from one or more shared folders.

7. The method of claim 1, wherein generating the access model comprises mapping users to a least-privileged permission group based on user activity.

8. The method of claim 1, wherein generating the access model comprises removing high risk trustees from the NTFS permissions.

9. The method of claim 1, further comprising identifying the plurality of shared folders as files that are a certain number of levels deep from a specified top level share.

10. The method of claim 1, wherein the access model adds a full control permission group for a user designated to have full control access to manage the plurality of shared folders.

11. The method of claim 1, further comprising setting a flag indicating that the plurality of shared folders do not inherit the existing NTFS permissions.

12. The method of claim 1, wherein updating the NTFS permissions of the shared folders comprises:
    removing inherited permissions for the plurality of shared folders; and
    applying the updated NTFS permissions for the created permission groups based on the access model.

13. A computing device, comprising:
    a processor;
    a memory in electronic communication with the processor; and
    instructions stored in the memory, the instructions being executable to:
      determine existing Server Message Block (SMB) permissions and existing new technology file system (NTFS) permissions for a plurality of shared folders;
      expand domain permission groups and local permission groups for the plurality of shared folders to determine existing users associated with the plurality of shared folders;
      determine access of the existing users to the plurality of shared folders based on the existing SMB permissions and the existing NTFS permissions;
      generate an access model that simulates a transformation of the existing NTFS permissions for the plurality of shared folders, the access model comprising proposed changes to the existing NTFS permissions, wherein the access model maps existing users with read access to read permission groups, the access model maps existing users with write access to read/write permission groups, and the access model downgrades existing users with full control access to the read/write permission groups;
      display the access model to present the proposed changes to the existing NTFS permissions;
      create permission groups for the plurality of shared folders based on the access model in response to a user accepting the proposed changes; and
      update the NTFS permissions of the shared folders based on the access model and permission groups, wherein the updated NTFS permissions break permission inheritance of the existing NTFS permissions for the plurality of shared folders.

14. The computing device of claim 13, wherein the instructions executable to generate the access model comprise instructions executable to compare access control lists of the plurality of shared folders to simulate changes to the existing NTFS permissions.

15. The computing device of claim 13, further comprising instructions executable to apply a traverse group to ensure access of shared folders to a root share after updating the NTFS permissions.

16. The computing device of claim 13, further comprising instructions executable to determine a scope of shared folders that are included in the access model.

17. The computing device of claim 13, further comprising instructions executable to assess existing access of shared folders that are included in the access model.

18. The computing device of claim 13, wherein the instructions executable to generate the access model comprise instructions executable to remove inactive users from one or more shared folders.

19. The computing device of claim 13, wherein the instructions executable to generate the access model comprise instructions executable to map users to a least-privileged permission group based on user activity.

20. The computing device of claim 13, wherein the instructions executable to generate the access model comprise instructions executable to remove high risk trustees from the NTFS permissions.

21. A non-transitory, tangible computer-readable medium, comprising executable instructions for:
- determining existing Server Message Block (SMB) permissions and existing new technology file system (NTFS) permissions for a plurality of shared folders;
- expanding domain permission groups and local permission groups for the plurality of shared folders to determine existing users associated with the plurality of shared folders;
- determining access of the existing users to the plurality of shared folders based on the existing SMB permissions and the existing NTFS permissions;
- generating an access model that simulates a transformation of the existing NTFS permissions for the plurality of shared folders, the access model comprising proposed changes to the existing NTFS permissions, wherein the access model maps existing users with read access to read permission groups, the access model maps existing users with write access to read/write permission groups, and the access model downgrades existing users with full control access to the read/write permission groups;
- displaying the access model to present the proposed changes to the existing NTFS permissions;
- creating permission groups for the plurality of shared folders based on the access model in response to a user accepting the proposed changes; and
- updating the NTFS permissions of the shared folders based on the access model and permission groups, wherein the updated NTFS permissions break permission inheritance of the existing NTFS permissions for the plurality of shared folders.

22. The computer-readable medium of claim 21, wherein the instructions executable for generating the access model comprise instructions executable for comparing access control lists of the plurality of shared folders to simulate changes to the existing NTFS permissions.

23. The computer-readable medium of claim 21, further comprising instructions executable for applying a traverse group to ensure access of shared folders to a root share after updating the NTFS permissions.

24. The computer-readable medium of claim 21, further comprising instructions executable for determining a scope of shared folders that are included in the access model.

25. The computer-readable medium of claim 21, further comprising instructions executable for assessing existing access of shared folders that are included in the access model.

26. The computer-readable medium of claim 21, wherein the instructions executable for generating the access model comprise instructions executable for removing inactive users from one or more shared folders.

27. The computer-readable medium of claim 21, wherein the instructions executable for generating the access model comprise instructions executable for mapping users to a least-privileged permission group based on user activity.

28. The computer-readable medium of claim 21, wherein the instructions executable for generating the access model comprise instructions executable for removing high risk trustees from the NTFS permissions.

* * * * *